Nov. 17, 1970 — O. BUTLER — 3,541,343
CONTROL SYSTEM FOR A TAXIMETER EQUIPPED VEHICLE
Filed Oct. 31, 1968 — 2 Sheets-Sheet 1
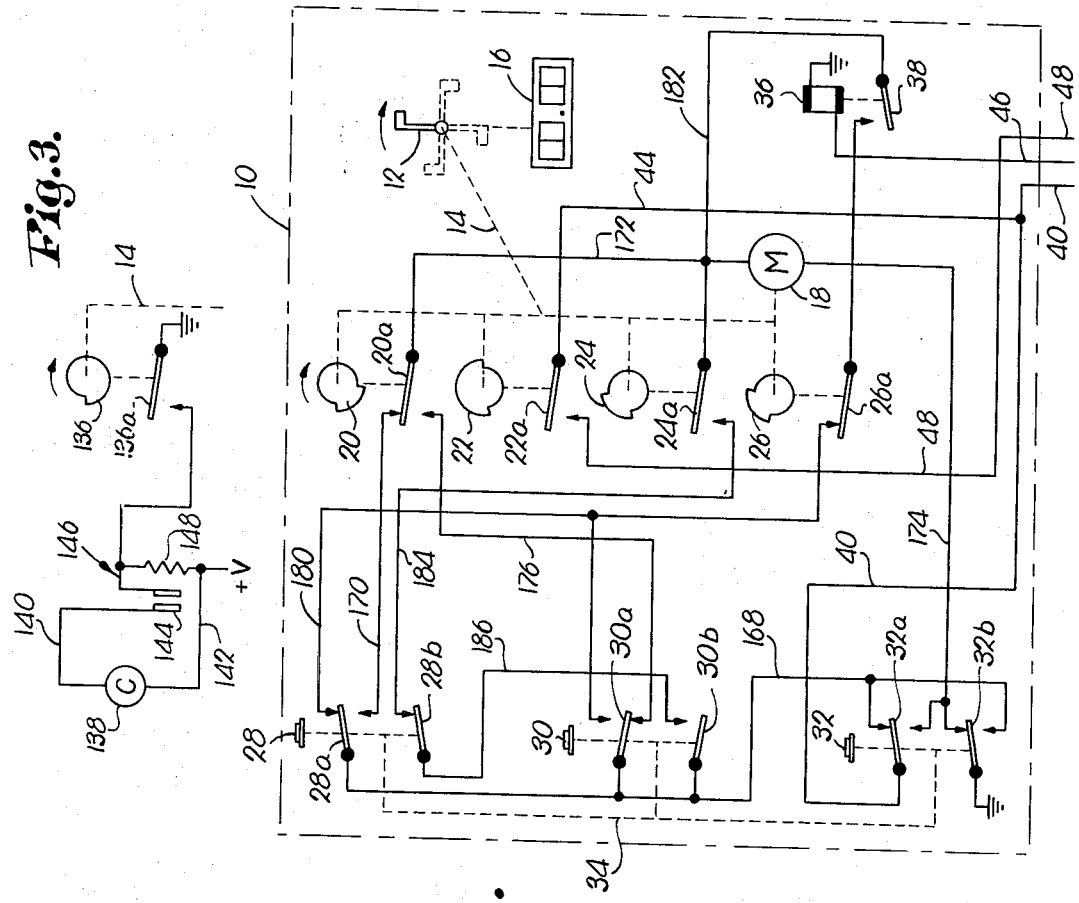
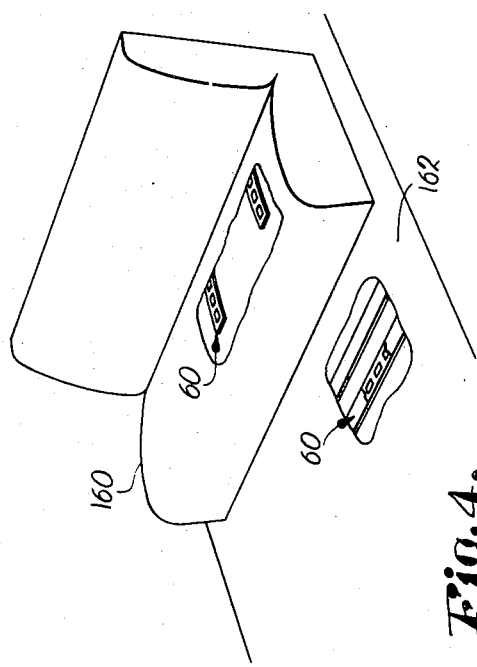
INVENTOR
Oscar Butler
BY Schmidt, Johnson, Hovey, Williams & Bradley
ATTORNEYS.

INVENTOR
Oscar Butler

United States Patent Office 3,541,343
Patented Nov. 17, 1970

3,541,343
CONTROL SYSTEM FOR A TAXIMETER EQUIPPED VEHICLE
Oscar Butler, 2068 S. Goodall Ave., Duarte, Calif. 91010
Filed Oct. 31, 1968, Ser. No. 772,261
Int. Cl. B60k 27/00
U.S. Cl. 307—10    16 Claims

ABSTRACT OF THE DISCLOSURE

A vehicle such as a taxicab is equipped with a motor-operated taximeter and has an electrical control system which automatically energizes the motor to render the meter operative in response to the closing of seat or floor switches by a passenger present in the passenger compartment. A backup kill circuit disables the vehicle engine in the event that the automatic turn-on malfunctions, unless the driver operates a manual "on" switch. The starter circuit of the engine is utilized by the system to provide a second backup for the automatic turn-on, repeated attempts to start the vehicle being effective to ultimately render the meter operative. The system responds to tampering by forcing the driver to operate the meter to run the engine. Automatic meter turnoff is effected when the passenger leaves the vehicle unless the meter is set for time recording.

---

The profitable operation of taxicab companies is dependent upon the income received from services rendered in transporting passengers. Such being the case, it is naturally important that the management of taxicab companies be assured that their drivers are honest and that all money received during operation of the vehicles is deposited with the company.

To insure that this is done, and to regulate the amount charged a passenger, meters are commonly installed in taxicabs or other public carrier vehicles to register the proper fare as determined by the distance traveled, or the distance plus an allowance for the time consumed. This arrangement, however, is only satisfactory if the driver of the vehicle renders the meter operable at the beginning of each trip. In order to prevent a dishonest driver from cheating the company by failing to operate the meter, coercion systems for carrier vehicles have been utilized which kill the engine in the event that the driver fails to operate the meter when a passenger is present in the passenger compartment. These coercion systems are designed to work in conjunction with a manually operated meter employing the customary flag which is moved to an operative position by the driver at the beginning of a trip, and subsequently shifted by hand to a standby position where the meter is inoperative at the end of the trip.

Recently, automatic motor-driven taximeters have been developed as a replacement for the manually operated, visible flag-type taximeter. Seat switches positioned in the passenger seats of the vehicle effect energization of the taximeter motor when a passenger is seated, thereby rendering the meter operative. Besides the automatic turn-on feature, the motor-driven taximeter eliminates rough handling of the meter which can occur with manual meters, and renders the meter housing easier to install in a padded dash or other recessed location due to the absence of the manually shiftable flag. However, the automatic turn-on feature is not the complete answer to protection against unscrupulous drivers who may attempt to cheat the taxicab company, since protection against failure of the automatic turn-on circuitry and protection against tampering with the cables interconnecting the seat switches and the control unit and meter of the system, together with other situations oftentimes encountered in the practical operation of taxicabs and other carrier vehicles, make it highly desirable to incorporate other features into the control system which will assure that the meter is properly operated at all times.

It is, therefore, an important object of the present invention to provide a control system for a public carrier vehicle equipped with an automatic meter, wherein the system renders the engine of the vehicle inoperable if automatic turn-on of the meter should fail to be effected due to a malfunction, thereby coercing the driver to manually turn on the meter if a passenger is to be carried.

Another important object of the invention is to provide a control system for a public carrier vehicle wherein floor switches in the passenger compartment are utilized in addition to the customary seat switches to assure that the system will not respond to a false indication that a passenger has left the passenger compartment.

Still another important object of this invention is to provide a control system for a public carrier vehicle which is protected against tampering by an unscrupulous driver such that, if the system is tampered with in an attempt to cheat the company, the system automatically responds to assure that the meter is rendered operative before it is possible to run the engine of the vehicle.

A further and important object of the present invention is to provide a control system for a public carrier vehicle in which a motor-driven meter is employed, wherein the system permits the driver to manually control the operational condition of the meter and yet effects automatic turn-on of the meter in the event that the driver fails to render the meter operative when the vehicle is hired by a passenger.

In conjunction with the preceding object, it is also an important aim to provide such a system in which the starting circuit of the vehicle is employed in a backup automatic turn-on circuit for the meter in the event that the driver fails to render the meter operative and the primary automatic circuitry malfunctions.

Yet another important object of the invention is to provide a control system for a public carrier vehicle which effects automatic turnoff of the registering meter of the vehicle when a passenger leaves the passenger compartment, unless the driver sets the meter for time recording during the passenger's absence.

An additional aim of the present invention is special applications is to provide such a control system which sets the meter on time recording a predetermined time after the driver sets the meter in nonrecording where the fare is determined by mileage only, in order to assure that the additional receipts or the time allowance will be collected while still permitting the driver to operate in nonrecording for a sufficient period of time to collect the fare at the end of a trip while the meter holds and registers the previously accumulated fare.

In the drawings:

FIG. 1 is an electrical schematic diagram of the meter unit of the system;

FIG. 3 is an electrical schematic diagram showing an optional arrangement which may be added where constant use of a time recording meter is permitted by local regulations;

FIG. 4 is a perspective view of a vehicle seat and adjacent floor, a part of the cover of the seat and the floor mat being broken away to show a typical installation of the passenger sensing switches in the seat and floor;

FIG. 5 is a plan view of one of the passenger sensing switches; and

FIG. 6 is a side view of the switch shown in FIG. 5, with parts thereof broken away and shown in cross section to reveal the construction thereof.

Figure 2:
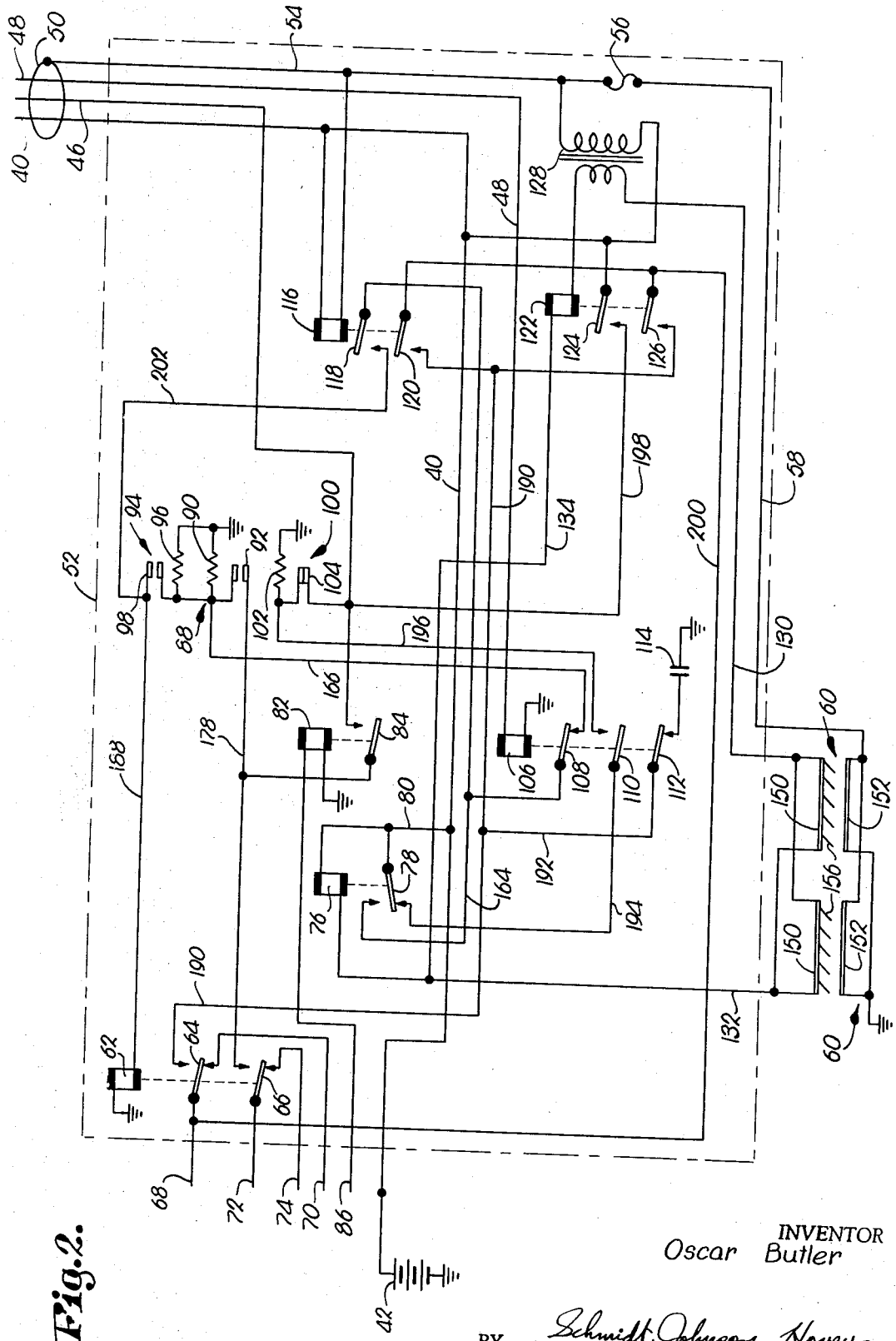
FIG. 2 is an electrical schematic diagram of the control unit of the system and the seat and floor switches.

Referring initially to FIG. 1, a broken line 10 represents a tamper-proof housing for the meter unit of the present invention. A taximeter within housing 10 is diagrammatically represented by a flag 12, an operating shaft 14 for the flag 12, and a fare register 16 which is rendered operative by the shaft 14 and indicates dollars and cents when the vehicle is in motion. It will be seen that the taximeter is of the automatic, motor-driven type, an electric motor 18 being illustrated coupled to the shaft 14. It should be understood that the flag 12 is not intended to comprise an illustration of a structural element of the taximeter, since the motor drive for the shaft 14 eliminates the need for providing the meter with a manually operable flag. The flag 12 is illustrated herein in order to present a visual indication of the operative condition of the fare register 16.

The particular condition of the register 16 is controlled by the angular position of the shaft 14. The system is shown in standby, as represented by the full line 12. An angular displacement in a clockwise sense of 90° places the fare register 16 in time recording where time, as well as mileage, determines the total fare. This is illustrated by the broken line, 3:00 o'clock and 6:00 o'clock positions of the flag 12. A 270° angular displacement of the shaft 14 (flag 12 at 9:00 o'clock) places the register 16 in nonrecording where the fare is determined solely by the mileage traveled. It is understood, of course, that in manual taximeters the flag 12 is a structural component of the meter and is rotated by the driver from the standby (12:00 o'clock) position to a selected operative position when the cab is hired by a passenger.

Four cams 20, 22, 24 and 26 rotate with shaft 14 and operate cam switches 20a, 22a, 24a and 26a respectively. The system is shown in standby, and the lobes of the cams 20–26 are not in positions causing actuation of the switches 20a–26a.

Three push buttons 28, 30 and 32 would normally be accessible to the driver from the front of housing 10 and operate respective double-pole switches 28a, 28b; 30a, 30b; and 32a, 32b. These switches are linked by a mechanical interlock illustrated diagrammatically at 34 such that only one of the double-pole switches may be operated at one time. The push button 28 is an "on" button, the push button 30 is an "off" button, and the push button 32 is a "reverse" button. The "on" button 28 and the reverse button 32 are illustrated in a condition to be selectively depressed by the driver, the poles of switches 28a, 28b and 32a, 32b being in engagement with their upper contacts. The "off" button 30 is shown operated as the case would normally be in standby, hence the poles of the switches 30a and 30b are down.

An "automatic" relay is located within housing 10 and has a coil 36 and a switch 38. A power lead 40 from the vehicle battery 42 (shown in FIG. 2) extends into housing 10 to the pole of switch 32a. The lead 40 is also connected by a lead 44 to the pole of switch 22a. A lead 46 in the automatic control circuitry extends from the coil 36 of the automatic relay to the outside of the tamper-proof housing 10. A second lead 48 extends outside the housing 10 from the normally open contact of switch 22a.

The leads 40, 46 and 48 form a cable which is covered by a flexible conductive shield 50 illustrated schematically in FIG. 2. The shield 50 extends from the tamper-proof housing 10 to a second tamper-proof housing 52 illustrated by the broken line in FIG. 2. The housing 52 contains the control unit of the present invention which may be located beneath the hood of the car adjacent the vehicle engine. The shield 50 terminates within the housing 52 in a lead 54 that extends to a fuse 56, a path to ground being completed by a lead 58 extending from the fuse 56 to the seat and floor switches 60, which will be described in detail hereinafter.

A "starter-ignition" relay is in the tamper-proof housing 52 and has a coil 62 and a pair of switches 64 and 66. A lead 68 extends from the distributor of the vehicle to the pole of switch 64, and a lead 70 extends from the ignition coil to the lower or normally closed contact of switch 64. Thus, the ignition circuit of the vehicle is made through the normally closed contact of the switch 64. In similar fashion, a lead 72 extends from the starter switch to the pole of switch 66, and a lead 74 is connected from the normally closed contact of the switch 66 to the starter solenoid.

A "passenger" relay has a coil 76 and a switch 78, one side of the coil 76 and the pole of the switch 78 being joined by a lead 80 which is connected to the power lead 40 from the battery 42. An "ignition" switch relay has a coil 82 and a switch 84, one side of the coil 82 being connected to the ignition switch of the vehicle by a lead 86. It may be appreciated that the leads 40, 68, 70, 72, 74 and 86 necessarily extend outside of the housing 52 to the mentioned components of the vehicle electrical system.

A primary time delay relay 88 is located in housing 52 and has a filament 90 and a pair of normally open contacts 92. The contacts 92 may be of the bimetallic type and would close, for example, after the filament 90 has been energized for 20 seconds. A secondary time delay relay 94 has a filament 96 connected in parallel with filament 90 and is provided with a pair of normally open contacts 98 that close after closure of contacts 92, such as following 30 seconds of energization of the filament 96. A third time delay relay 100 has a filament 102 and a pair of normally closed contacts 104 that would open, for example, after energization of filament 102 for approximately 2 seconds.

A "meter" relay has a coil 106 and three switches 108, 110 and 112, the normally closed contact of switch 112 being connected to ground through a capacitor 114. The lead 48 extends to one side of the meter relay coil 106, the other side of the coil being returned to ground.

The relays previously described are all de-energized when the system is in standby. However, a pair of "tamper" relays within housing 52 are energized in standby, the first such relay operating at the voltage of battery 42 (normally 12 volts) and comprising a relay coil 116 and a pair of switches 118 and 120. One side of the coil 116 is connected to the lead 40, while the other side of the coil is returned to ground via the lead 54.

The second tamper relay has a coil 122 operated at a voltage lower than the voltage of the battery 42, such as 6 volts. The relay coil 122 actuates a pair of switches 124 and 126, the 6 volts operating potential being provided by the secondary of a step-down transformer 128 which has its primary connected to lead 54 and lead 40. The secondary of the transformer 128 extends to coil 122 and to the seat and floor switches 60 along a lead 130. A second lead 132 interconnects the seat and floor switches 60 with the passenger relay coil 76, and a lead 134 is connected from lead 132 to tamper relay coil 122 to complete the 6 volt power circuit thereto.

Referring to FIG. 3, a fifth cam 136 is illustrated as an optional arrangement on the shaft 14, the cam 136 being operably associated with a cam switch 136a. The clock 138 of the taximeter is diagrammatically illustrated and is rendered operational by connecting a pair of leads 140 and 142 across the vehicle power source. The leads 140 and 142 are connected to the clock 138, the latter being of the electrically initiated type commonly employed in conventional taximeters. The lead 142 is directly connected to a suitable high voltage lead (+V), with the lead 140 being connected to the normally open contacts 144 of a time delay relay 146 having a filament 148 connected in series relationship with the positive power lead and the normally open contact of the cam switch 136a. The pole of the switch 136a is grounded to provide the electrical return, as indicated by the ground symbol.

The passenger sensing switching arrangement is illustrated in detail in FIGS. 4–6. Each switch 60 includes an elongated, upper contact strip 150 of electrically conductive material held in spaced relationship from a lower contact strip 152 by a series of spacers 154 of resilient material such as sponge rubber, plastic or the like. A series of contacts 156, which may be integral with the upper contact strip 50, depend therefrom and are normally maintained in spaced relationship from the lower contact strip 152. The contacts 156 are close enough to the lower contact 152 that any appreciable pressure upon the upper contact strip 150 causes the lower end of a particular contact or contacts 156 to engage the lower contact strip 152. As is clear in FIG. 6, each contact 156 is separated from an adjacent contact 156 by a corresponding spacer 154.

As seen in FIG. 6, each switch 60 is encased by a cover 158, the latter being removed in FIG. 5 in order to show the construction of the upper contact strip 150 and the depending contacts 156 which, in the embodiment shown, are formed as tabs integral with the strip 150. In FIG. 4, a passenger seat 160 is depicted in association with the floor 162 of the passenger compartment of the vehicle upon which the feet of a seated passenger rest. As illustrated, the switches 60 are disposed in the cushion of the seat 160 and also beneath the floor mat or carpet of the floor 162, and are arranged so that a passenger in any of the seating areas will effect closure of at least one of the switches 60, either in the seat 160 or in the floor 162. The seat and floor switches 60 are arranged in parallel as illustrated in FIG. 2 where one of the seat switches and one of the floor switches are shown schematically.

OPERATION

With the vehicle engine running, the ignition switch (not shown) is closed and thus positive potential via lead 86 is available to energize the ignition switch relay coil 82, thereby closing switch 84. When the vehicle is hired and a passenger enters the passenger compartment, the passenger relay coil 76 is energized by closure of one or more of the seat and floor switches 60. This occurs by virtue of the lead 132 which is connected to the grounded lower contact strips 152 when one or more of the upper contact strips 150 are depressed by the passenger.

With the passenger relay coil 76 energized, the relay switch 78 establishes a power connection to switch 108 of the meter relay via lead 80 and a lead 164. The normally closed contact of switch 108 is connected to the filaments 90 and 96 of the delay relays 88 and 94 by a lead 166. If the meter is not placed in operation by the driver by depressing the "on" button 28, the meter will be automatically turned on after the delay relay 88 times out and contacts 92 close.

Automatic turn-on will be subsequently discussed, but it is first instructive to refer to FIG. 1 and understand the manner in which the meter is rendered operative by depressing the "on" button 28, which is the action that the driver should take at the commencement of a trip for hire. When button 28 is depressed, the switches 30a and 30b return to normal by the action of the mechanical interlock 34. The switches 28a and 28b are actuated, the poles thereof shifting to their lower positions whereupon a power circuit to motor 18 is established as follows: From lead 40 to switch 32a, along a lead 168 to switch 28a, along a lead 170 to cam switch 20a, and thence along a lead 172 to motor 18. The opposite electrical side of motor 18 is returned to ground by a lead 174 that extends to the normally closed contact of switch 32b.

Energization of motor 18 causes shaft 14 to rotate in a clockwise direction as illustrated by the arrow associated with the cams 20–26. At 270° of rotation, the lobe of cam 20 operates switch 20a to break the power circuit to the motor 18. This represents a flag position of 9:00 o'clock which, in the exemplary meter chosen for illustration, is the nonrecording operational condition of the meter where only mileage contributes to the accumulated fare. Once the trip is completed, depressing the "off" button 30 shifts switch 30a to the position thereof illustrated to again establish a power circuit to motor 18, such circuit now being along a lead 176 and through the lower contact of switch 20a. The lobe of cam 20 is cut such that, once an additional 90° of rotation is effected to complete one full revolution, the switch 20a returns to the position illustrated to break the circuit through its lower contact and deenergize the motor 18, leaving the system in standby.

In the event that the driver fails to depress the "on" button 28, the meter will automatically be rendered operative as mentioned above. This occurs after 20 seconds upon closure of contacts 92 of the delay relay 88, a circuit being established as follows: From switch 108 of the meter relay, along lead 166 to contacts 92, along a lead 178 to the now closed switch 84 of the ignition switch relay, and thence along lead 46 to the coil 36 of the automatic relay (FIG. 1). This effects closure of switch 38 of the automatic relay to make power available to motor 18 via a lead 180, cam switch 26a, and a lead 182. The motor shaft 14 now rotates 90°, at which time the lobe of cam 22 actuates cam switch 22a to, in turn, connect lead 48 to lead 44, the latter being an extension of the power lead 40. The presence of positive potential on lead 48 energizes the coil 106 of the meter relay to open switch 108 and thereby deenergize the coil 36 of the automatic relay. Although the shaft 14 stops after 90° of rotation, this corresponds to a 3:00 o'clock flag position which, in the exemplary meter, is effective to place the meter in time recording and thus render the meter operative. The burden is thus left to the driver to now depress the "on" button 28 to cause the shaft 14 to complete 270° of rotation as discussed above. It should be understood at this juncture that, in the illustrated system, only the 6:00 o'clock and 9:00 o'clock positions are utilized, depending on whether or not the driver wishes to place the meter in time recording (6:00 o'clock). The time recording operational mode naturally increases the fare and is utilized only under proper circumstances which are oftentimes dictated by local regulations. Although the 3:00 o'clock position is not used herein, 90° of shaft rotation is sufficient to render the meter operative and remind the driver that he forgot to push the "on" button 28.

In the event that the driver does wish to utilize the time recording or 6:00 o'clock position, he merely depresses the reverse button 32 to cause the motor 18 to rotate shaft 14 in a counterclockwise direction through a displacement of 90°, after the 270° or 9:00 o'clock position is reached. This is no inconvenience since only a few seconds time is required for motor 18 to advance the shaft 270°. Thus, only a momentary pause is necessary between initially depressing the "on" button 28 and subsequently actuating the reverse button 32. When the switches 32a and 32b establish electrical continuity through their lower or normally open contacts, lead 168 is now at ground potential and the positive power lead 40 is connected to the lead 174. Lead 172 is now connected to ground through the closed cam switch 24a (270° of rotation of shaft 14 having previously occurred), a lead 184, switch 28b, a lead 186, and switch 30b. The cam switch 24a reopens when the cam 24 returns to the 180° position since the lobe of cam 24 terminates to release the switch 24a, thereby deenergizing the motor 18.

Now considering the circumstance wherein the driver fails to depress the "on" button 28 and the automatic turn-on circuit malfunctions, such as by failure of contacts 92 to close, backup kill circuitry is provided by the system due to the presence of the delay relay 94 and a lead 188 which connects the contacts 98 to the coil 62 of the starter-ignition relay. Thirty seconds after energization of filament 96, the contacts 98 close and this is effective to energize relay coil 62 unless the meter has been rendered operative, in which case the meter relay coil 106 will be energized and switch 108 will open. But if the meter is still inoperative, switch 108 remains closed and energization of relay coil 62 actuates switches 64 and 66 to ground the distributor lead 68 via the following circuit: From lead 68 to switch 64, along a lead 190 to a connecting lead 192, from lead 192 to switch 112, and thence through the capacitor 114 to ground. The engine may now be started only by rendering the meter operative, as by depressing the "on" button 28 whereupon energization of the meter relay coil 106 occurs after 90° of rotation of shaft 14 upon closure of cam switch 22a.

A second backup feature is also provided which is useful in the event that the driver continues to crank the engine without realizing that the control system has actuated the kill circuitry due to a malfunction of the primary automatic turn-on circuit. With the starter switch (not shown) closed in an attempt to start the engine, positive potential is made available at lead 72 by the closed starter switch, such lead 72 now being connected to the lead 178 since the relay switch 66 now establishes electrical continuity through its upper contact. Lead 178 is connected to switch 84 (now closed), thus closure of the starter switch makes positive potential available on lead 46 to energize the coil 36 of the automatic relay. Therefore, it may be appreciated that, if the cumulative time that the starter switch is closed is sufficiently great, closure of switch 38 will effect automatic turn-on of the meter as in the normal automatic turn-on arrangement where positive potential is delivered to lead 46 by the closure of the delay relay contacts 92.

The meter will also be automatically turned off in the event that a passenger leaves the vehicle and the driver fails to depress the "off" button 30. This forces the driver to "re-flag" so that a full fare will be charged for a subsequent trip. The automatic "off" function is initiated by the passenger leaving the passenger compartment, whereupon switch 78 returns to the position illustrated and switch 110 of the meter relay is now connected to positive potential via a lead 194. Since the switch 110 is closed with the meter in operation, positive potential is made available to the contacts 104 of the delay relay 100 by a lead 196 which is connected to switch 110. The normally closed contacts 104 are connected to lead 46, thus the coil 36 of the automatic relay is momentarily energized to effect advancement of the motor shaft 14 past the 270° position until cam 22 releases cam switch 22a to reopen the latter. It may be noted in FIG. 1 that the lobe of cam 22 extends somewhat past 270°. Reopening of cam switch 22a deenergizes the meter relay coil 106 to reopen switch 110, thereby deenergizing the coil 36 of the automatic relay. This occurs within the two seconds that contacts 104 remain closed. The displacement of shaft 14 is sufficient to render the meter inoperative but does not return shaft 14 to the standby position thereof, but this is then completed by the driver by depressing the "off" button 30.

An exception to the automatic initiation of meter turn-off must be made for trips in which the passenger wishes to momentarily leave the cab and then return to complete the trip. During this time the cab company desires that the meter be set in time recording so that the driver will charge for the time that the passenger is away from the cab, even though the vehicle is not in motion. Therefore, by depressing the reverse button 32 before the passenger leaves the cab, the register 16 will hold the accumulated fare and time recording will begin. The meter is not automatically turned off since, in reversing to the 180° shaft position, the cam 26 opens cam switch 26a so that the automatic circuit is interrupted. It may be noted in FIG. 1 that the lobe of cam 26 is present at 180° but terminates just short of 270°, so that the cam switch 26a will be open at 180° but closed at the 270° position.

In connection with the automatic meter turnoff feature discussed above, it is noteworthy that the provision of both floor and seat switches 60 minimizes the likelihood of inadvertent activation of the automatic "off" function before the passenger leaves the vehicle at the end of a trip. For example, a false system response could occur in the absence of floor switches in the event that the passenger moves to the front of the seat 160 during the trip or undergoes other movements such as reaching into a pocket for money to pay the driver that might cause the seat switches to momentarily open. It should be understood that a false indication that the passenger has left must be precluded in the present system since the automatic turnoff function would reset the fare register 16 and lose the total previously accumulated.

In localities where the meter may be operated in time recording at all times so that time consumed as well as mileage contributes to the total fare indicated by the register 16, the supplemental circuitry of FIG. 3 is useful. There would be times when the driver would wish to operate the meter in nonrecording, such as at the end of a trip when he is waiting for the passenger to pay the fare. At such time the driver would depress the "on" button 28 to move the shaft 14 from the previous 6:00 o'clock position to the 9:00 o'clock position, whereupon cam 136 effects closure of cam switch 136a to energize the filament 148 of the delay relay 146. After the exemplary two minute period, the contacts 144 close to effect initiation of the clock 138, and the meter is now in time recording as if the shaft 14 was returned to the 6:00 o'clock position. However, the system has permitted the meter to be set in the nonrecording 9:00 o'clock position for a period of two minutes or some other suitable period of sufficient length to permit the driver to collect the fare.

The tamper-proof housings 10 and 52 are employed to prevent an unscrupulous driver from attempting to cheat the company by disabling the automatic control system so that the cab may be driven without operating the meter. However, certain connections must necessarily pass outside of the tamper-proof housings and are particularly subject to tampering. In the present system, if the driver attempts to disable the system by severing either of the three leads 58, 130 or 132 which extend to the floor and seat switchs 60 from the housing 52, the normally energized coil 122 of the 6-volt tamper relay is deenergized to close the switches 124 and 126. Closure of switch 124 connects the positive power lead to lead 46 through switch 124 and a lead 198, thereby initiating the automatic turn-on function by energizing the coil 36 of the automatic relay. Automatic turn-on of the meter then occurs in the same manner as previously described. An engine kill circuit via lead 190 is also activated by the closure of switch 126, since the pole of switch 126 is connected to the distributor lead 68 by a lead 200. Until the meter is rendered operative to thereby energize the meter relay coil 106, a grounding circuit is completed via lead 190 through the connecting lead 192, the closed switch 112, and the capacitor 114. The disability of the vehicle engine may always, of course, be removed by depressing the "on" button 28. It may thus be observed that the penalty for tampering with any of the floor or seat switch leads is the requirement that the meter be "on" in order to run the engine of the vehicle. The driver is thus forced to return to the company garage, and a supervisory official is immediately aware that these leads have been tampered with since the engine will not run unless the meter is on.

Furthermore, severing the grounded lead 58 also causes deenergization of the coil 116 of the 12-volt tamper relay. Deenergization of coil 116 also occurs if fuse 56 melts due to the flow of heavy currents therethrough caused by a short circuit condition. A short is induced if the driver should attempt to tamper with the cable that interconnects the housings 10 and 52, it being remembered that this cable comprises leads 40, 46 and 48 which are encased in a conductive shield 50. The shield 50 may be made of a flexible material which is inherently soft and subject to puncture should the driver attempt to disable the system by shorting across the cable leads, such as by inserting a pin or other sharp, conductive instrument into the cable. This is a method often practiced by drivers in an attempt to circumvent taxicab control systems, but in the present system such practice merely shorts the power lead 40 to the grounded shield 50, thereby melting the fuse 56 and causing both of the relay coils 116 and 122 to become deenergized. Closure of switch 120 by deenergization of coil 116 activates the kill circuit through lead 190 previously described since relay switches 120 and 126 are connected in parallel. The closure of switch 118 makes it impossible to carry a passenger even if the meter is in operation since the coil 62 of the starter-ignition relay is energized by the following circuit: From power lead 40 to lead 82 and through switch 78 to lead 164 (the switch 78 now establishes electrical continuity through its upper contact due to the presence of a passenger), through the now closed switch 118 to a lead 202, and thence along lead 188 to relay coil 62. With the coil 62 energized, switches 64 and 66 break the ignition and starting circuits of the engine and the passenger must leave the passenger compartment before the engine can be operated. Thus, when the driver returns the impaired cab to the company garage, the supervisor may determine the cause of the trouble by simply sitting on the seat 160. If the engine dies, it is evident that the driver has tampered with lead 58 or that the fuse 56 must be replaced; if the engine continues to run, it is evident that the leads 130 and 132 to the upper contact 150 of the switches 60 must be checked for tampering.

Having thus described the invention, what is claimed as new and desired to be secured by Letters Patent is:

1. In an electrical control system for a carrier vehicle for hire having a meter for registering the fare and an operating circuit for the prime move of the vehicle, the combination of:

driver accessible, manually actuatable means adapted for coupling with said meter for rendering the latter operative;

means for sensing the presence of a passenger in said vehicle;

apparatus coupled with said sensing means and adapted to be coupled with said meter for automatically rendering the latter operative in response to detection of the presence of a passenger by said sensing means should the driver fail to manually effect operation of the meter;

backup kill circuitry coupled with said apparatus and adapted to be coupled with said operating circuit for rendering the latter inoperable in the event that said apparatus malfunctions and fails to automatically place the meter in operation whereby, if the driver initially does not actuate the manually actuatable means and said apparatus then fails to automatically render the meter operative, the kill circuitry prevents operation of the vehicle; and means coupled with said kill circuitry and responsive to operation of said meter for disabling the kill circuitry, whereby the driver is coerced to actuate said manually actuatable means and thereby render the meter operative in order to carry the passenger.

2. The combination as claimed in claim 1,
said apparatus having means delaying operation thereof for a predetermined time period following said detection of the presence of a passenger;
said kill circuitry having means delaying operation thereof for a predetermined time duration following said detection of the presence of a passenger, said duration being longer than said period.

3. The combination as claimed in claim 1,
said apparatus, during proper function thereof, being operable to effect automatic return of said meter to an inoperative condition when the passenger leaves the vehicle.

4. In an electrical control system for a carrier vehicle for hire provided with a fare register, the combination of:
an electric motor adapted for coupling with said register for rendering the latter operative;
driver accessible, manually actuatable switch means coupled with said motor for energizing the latter upon actuation of the switch means to place the register in operation;
means for sensing the presence of a passenger in said vehicle; and
apparatus coupled with said sensing means and said motor for energizing the latter in response to detection of the presence of a passenger by said sensing means to automatically render the register operative in the event that the driver fails to actuate said switch means.

5. The combination as claimed in claim 4,
said apparatus having means delaying operation thereof for a predetermined time period following said detection of the presence of a passenger.

6. The combination as claimed in claim 4,
said apparatus being operable to cause said motor to effect automatic return of said register to an inoperative condition when the passenger leaves the vehicle.

7. In the electrical control system of claim 4 where the vehicle is further provided with a starting circuit for the prime mover thereof and an operating circuit for the prime mover, the combination as claimed in claim 4 further comprising:
back-up kill circuitry coupled with said apparatus and adapted to be coupled with said operating circuit for rendering the latter inoperable in the event that said apparatus malfunctions and fails to automatically place the register in operation; and
back-up automatic motor operating means coupled with said motor, adapted to be coupled with said starting circuit and operable upon operation of said kill circuitry to energize said motor in response to current flow in said starting circuit, whereby attempts to start the prime mover will ultimately cause the register to be rendered operative.

8. The combination as claimed in claim 7,
and means coupled with said kill circuitry and responsive to operation of said register for disabling the kill circuitry, whereby the driver may start the prime mover by first actuating said switch means to render the register operative.

9. In an electrical control system for a carrier vehicle for hire having a meter for registering the fare, the combination of:
means for sensing the presence of a passenger in said vehicle; and
apparatus coupled with said sensing means, adapted to be coupled with said meter and operable to automatically render the latter operative in response to detection of the presence of a passenger by said sensing means, and automatically return the meter to an inoperative condition when the passenger leaves the vehicle.

10. In the electrical control system of claim 9 where said meter has a first operational state in which the fare is based only on mileage and a second operational state in which both mileage and time contribute to the total fare, the combination as claimed in claim 9 further comprising:
means coupled with said apparatus and adapted for coupling with said meter for rendering the apparatus incapable of automatically returning the meter to said inoperative condition when the meter is in said second operational state thereof.

11. The combination as claimed in claim 10,
and driver accessible, manually actuatable means adapted for coupling with said meter for causing the latter to change from the first to the second operational state thereof upon actuation of the actuatable means.

12. The combination as claimed in claim 10, and means adapted for coupling with said meter and operable when the meter is in its first operational state to cause the meter to change to its second operational state after a predetermined time duration.

13. In the electrical control system of claim 9 where said vehicle has a passenger seat and a floor upon which the feet of a seated passenger are normally disposed, the combination as claimed in claim 9 wherein said sensing means includes:
first switching structure adapted for disposition in said seat for actuation by a passenger seated thereon; and
second switching structure adapted for disposition on said floor for actuation by the feet of the seated passenger;
there being means independently coupling said first and second switching structures with said apparatus to render the latter responsive to the presence of the passenger as sensed by actuation of either said first or said second switching structure, whereby to prevent automatic return of the meter to said inoperative condition as a result of a false system response to deactuation of one of said switching structures while the other switching structure remains actuated by the passenger.

14. In an electrical control system for a carrier vehicle for hire provided with a passenger seat and an operating circuit for the prime mover thereof, the combination of:
a meter for registering the fare and having an inoperative condition and an operative, fare-registering condition;
means adapted for disposition in said seat for sensing the presence of a passenger and establishing a predetermined electrical condition when the passenger is sensed;
electrically responsive control means coupled with said sensing means and said meter for assuring that the latter is rendered operative upon detection of the presence of the passenger by said sensing means;
tamper-proof structure housing said meter and said control means;
electrical cable means interconnecting said sensing means and said control means and including conductors outside of said tamper-proof structure;
tamper-responsive means in said structure coupled with said cable means and said meter for assuring that the latter is rendered operative and remains operative irrespective of the presence or absence of a passenger in said seat in the event that any of said conductors are tampered with;
a kill circuit in said tamper-proof structure adapted for coupling with said operating circuit for rendering the latter inoperable;
said tamper-responsive means activating said kill circuit to prevent operation of the prime mover in response to tampering with any of said conductors; and
means in said structure coupled with said kill circuit and responsive to operation of said meter for disabling the kill circuit, whereby with said conductors in a tampered condition the prime mover may be operated only if the meter is operative.

15. The combination as claimed in claim 14, and means in said tamper-proof structure coupled with said sensing means through one of said conductors and adapted to be coupled with said operating circuit for rendering the latter inoperable irrespective of the condition of the meter upon said detection of the passenger by the sensing means when a certain other of said conductors has been tampered with, whereby to prevent operation of the prime mover with a passenger present when said other conductor has been tampered with in addition to requiring that the meter be operative in order to operate the prime mover.

16. In an electrical control system for a carrier vehicle for hire provided with a passenger seat, the combination of:
a meter for registering the fare and having an inoperative condition and an operative, fare-registering condition;
means adapted for disposition in said seat for sensing the presence of a passenger and establishing a predetermined electrical condition when the passenger is sensed;
electrically responsive control means coupled with said sensing means and said meter for automatically rendering the latter operative upon detection of the presence of the passenger by said sensing means;
tamper-proof structure housing said meter and said control means;
electrical cable means interconnecting said sensing means and said control means and including conductors outside of said tamper-proof structure; and
tamper-responsive means in said structure coupled with said cable means and said meter for automatically rendering the latter operative and maintaining the meter in operation irrespective of the presence of absence of a passenger in said seat in the event that any of said conductors are tampered with.

References Cited
UNITED STATES PATENTS

| | | | |
|---|---|---|---|
| 1,728,648 | 9/1929 | Weiss | 180—102 |
| 2,731,100 | 1/1956 | Butler. | |
| 3,111,185 | 11/1963 | Butler | 180—102 |
| 3,343,624 | 9/1967 | Shaheen | 180—102 |

ROBERT K. SCHAEFER, Primary Examiner

T. B. JOIKE, Assistant Examiner

U.S. Cl. X.R.

180—102; 200—85